(12) United States Patent
Franco et al.

(10) Patent No.: US 11,545,017 B2
(45) Date of Patent: Jan. 3, 2023

(54) ENHANCED LOCATION TRACKING USING ULTRA-WIDEBAND

(71) Applicant: 32 TECHNOLOGIES LLC, Berkeley Heights, NJ (US)

(72) Inventors: Bradley Franco, Berkeley Heights, NJ (US); Luis Hernandez, Cordoba (AR)

(73) Assignee: 32 TECHNOLOGIES LLC, Berkeley Heights, NJ (US)

( * ) Notice: Subject to any disclaimer, the term of this patent is extended or adjusted under 35 U.S.C. 154(b) by 135 days.

(21) Appl. No.: 17/271,059

(22) PCT Filed: Aug. 26, 2019

(86) PCT No.: PCT/US2019/048163
§ 371 (c)(1),
(2) Date: Feb. 24, 2021

(87) PCT Pub. No.: WO2020/041795
PCT Pub. Date: Feb. 27, 2020

(65) Prior Publication Data
US 2021/0327243 A1    Oct. 21, 2021

Related U.S. Application Data

(60) Provisional application No. 62/722,429, filed on Aug. 24, 2018.

(51) Int. Cl.
*G08B 21/02* (2006.01)
*A01K 11/00* (2006.01)
(Continued)

(52) U.S. Cl.
CPC ........ *G08B 21/0272* (2013.01); *A01K 11/008* (2013.01); *A01K 15/023* (2013.01);
(Continued)

(58) Field of Classification Search
CPC .. G08B 21/0272; G08B 21/023; G08B 29/04; A01K 11/008; A01K 15/023; H04B 1/7176
See application file for complete search history.

(56) References Cited

U.S. PATENT DOCUMENTS 5,241,923 A * 9/1993 Janning ................ A01K 27/009
119/908
5,892,454 A * 4/1999 Schipper .............. G08B 21/245
379/38

(Continued)

*Primary Examiner* — Nay Tun
(74) *Attorney, Agent, or Firm* — Troutman Pepper Hamilton Sanders LLP

(57) ABSTRACT

Disclosed herein are systems and methods related to a wireless tracking system: The wireless tracking system having a plurality of beacons, each of the plurality of beacons having at least one antenna and at least one power source. When the at least one antenna is supplied with power via the power source, a local ping is transmitted from the beacon. A wireless tracking device then receives the ping via its own antenna. Once the wireless tracking device has received a locational ping from at least two of the plurality of beacons, it can then calculate a direct connection path between the at least to beacons. Based on this known path, the wireless tracking device can then determine a distance between the wireless tracking device and connection path. Based on the determined distance, the wireless tracking device may then issue a corrective measure.

18 Claims, 14 Drawing Sheets

(51) Int. Cl.
  *A01K 15/02*  (2006.01)
  *G08B 29/04*  (2006.01)
  *H04B 1/7176*  (2011.01)

(52) U.S. Cl.
  CPC .......... *G08B 21/023* (2013.01); *G08B 29/04* (2013.01); *H04B 1/7176* (2013.01)

(56) References Cited

U.S. PATENT DOCUMENTS

| | | | | |
|---|---|---|---|---|
| 6,581,546 | B1* | 6/2003 | Dalland | A01K 15/023 |
| | | | | 119/712 |
| 6,958,677 | B1* | 10/2005 | Carter | G06K 19/07762 |
| | | | | 340/10.2 |
| 8,939,111 | B2* | 1/2015 | Berntsen | A01K 15/023 |
| | | | | 119/721 |
| 9,125,107 | B1* | 9/2015 | McMullen | H04W 64/00 |
| 9,237,689 | B2* | 1/2016 | Choi | A01D 34/008 |
| 10,514,439 | B2* | 12/2019 | Seltzer | A01K 27/009 |
| 10,845,451 | B1* | 11/2020 | Bloechl | G01S 13/876 |
| 2001/0007335 | A1* | 7/2001 | Tuttle | H01Q 1/2225 |
| | | | | 235/492 |
| 2003/0142587 | A1* | 7/2003 | Zeitzew | G01S 7/52004 |
| | | | | 367/127 |
| 2006/0290519 | A1* | 12/2006 | Boate | G07C 9/28 |
| | | | | 340/573.4 |
| 2007/0073482 | A1* | 3/2007 | Churchill | A63B 69/36 |
| | | | | 701/492 |
| 2008/0143516 | A1* | 6/2008 | Mock | G08B 21/0269 |
| | | | | 455/67.11 |
| 2010/0178934 | A1* | 7/2010 | Moeglein | G01S 5/0263 |
| | | | | 455/456.1 |
| 2012/0035427 | A1* | 2/2012 | Friedman | A61B 5/1112 |
| | | | | 600/300 |
| 2012/0169541 | A1* | 7/2012 | Singh | G01S 1/0428 |
| | | | | 342/417 |
| 2013/0162460 | A1* | 6/2013 | Aryanfar | G01S 5/0294 |
| | | | | 342/42 |
| 2015/0122199 | A1* | 5/2015 | Koplin | A01K 15/021 |
| | | | | 119/718 |
| 2015/0163764 | A1* | 6/2015 | Stern | G01S 5/18 |
| | | | | 348/143 |
| 2017/0154508 | A1* | 6/2017 | Grant | G08B 21/0272 |
| 2018/0241489 | A1* | 8/2018 | Daoura | H04L 67/10 |
| 2020/0110146 | A1* | 4/2020 | Barker | G01S 1/0428 |

\* cited by examiner

ENHANCED LOCATION TRACKING USING ULTRA-WIDEBAND

RELATED APPLICATIONS

The present application is a U.S. national stage filing under 35 U.S.C. § 371 of International Application No. PCT/US2019/048163 filed on Aug. 26, 2019 entitled "ENHANCED LOCATION TRACKING USING ULTRA-WIDEBAND," which claims priority to U.S. Provisional Application No. 62/722,429 filed on Aug. 24, 2018 entitled "ENHANCED LOCATION TRACKING USING ULTRA-WIDEBAND," each of which is incorporated herein by reference in its entirety.

BACKGROUND

The location information of individuals and devices may be important in a variety of settings. For example, a company or organization may wish to track their employees and/or important assets. Tracking location information can be used for a variety of purposes, for example, safety, security, efficiency, etc.

Although tracking has many uses, some illustrative embodiments discussed herein are specifically directed toward tracking animals (e.g., pets, such as dogs). Most dogs, especially larger breeds, may require a lot of physical activity (e.g., jogging, playing fetch, etc.). As the general population has become more urban and suburban, it has become increasingly difficult to provide the necessary space for these larger pets to exercise.

Many suburban homeowners have turned to underground and/or wireless invisible fence containment systems. In general, most currently available pet containment systems work in much the same way. They create a containment boundary (e.g., via an underground wire or determined wireless signal strength) and issue a corrective action if a pet gets close to or crosses the containment boundary. Generally, a device is worn on a dog's collar that emits an audio and/or physical (e.g., vibration, electrical, etc.) stimulus as the corrective action. When combined with training, these stimuli help condition the dog to remain within the containment area.

Underground containment systems have been in existence since the early 1970's and remain the most prevalent solution. Today, underground solutions come in a variety of packages, from professionally installed, including dog training, to do-it-yourself systems. Both underground and wireless systems have their advantages and disadvantages as discussed herein.

SUMMARY

Disclosed herein are systems and methods related to a wireless tracking system: The wireless tracking system having a plurality of beacons, each of the plurality of beacons having at least one antenna and at least one power source. When the at least one antenna is supplied with power via the power source, a local ping is transmitted from the beacon. A wireless tracking device then receives the ping via its own antenna. Once the wireless tracking device has received a locational ping from at least two of the plurality of beacons, it can then calculate a direct connection path between the at least to beacons. Based on this known path, the wireless tracking device can then determine a distance between the wireless tracking device and connection path. Based on the determined distance, the wireless tracking device may then issue a corrective measure. The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

BRIEF DESCRIPTION OF THE DRAWINGS

For illustrating some embodiments of the disclosure, there is shown in the drawings various embodiments, it being understood, however, that the disclosure is not limited to the specific instrumentalities disclosed as they are used for illustrative purposes only. Included in the drawings are the following Figures.

DETAILED DESCRIPTION

Figure 1:
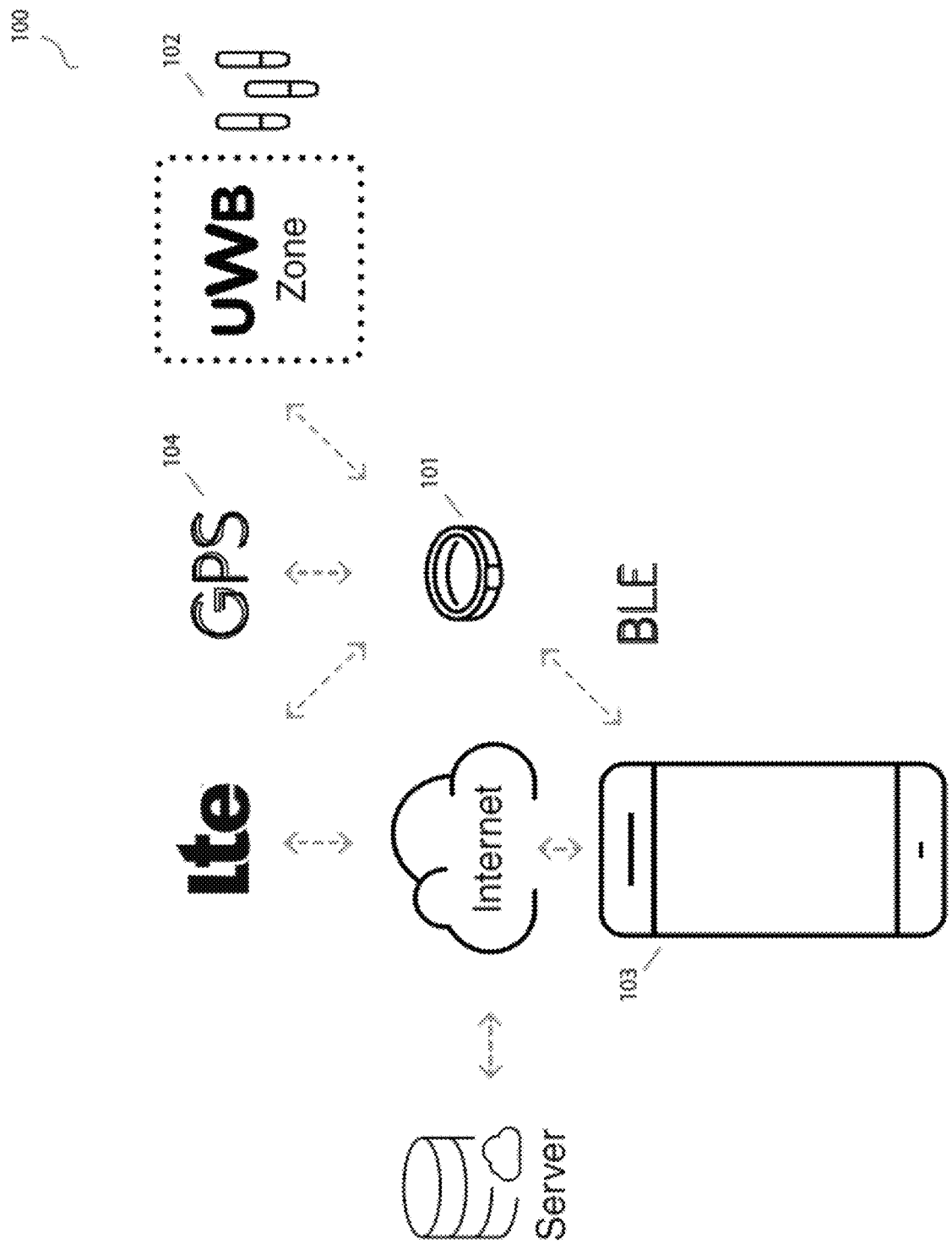
FIG. 1 depicts an illustrative system for enhanced location tracking for pet containment.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

As discussed herein, current location tracking devices, e.g., pet containment zones, are generally limited to underground systems, wireless tracking systems, and radio frequency ID tracking. The majority of containment systems purchased today are professionally installed and can be prohibitively expensive. Not only is the upfront cost of an underground system high, but they have additional maintenance costs, for example, the underground wires can be easily broken by landscapers, roots, wildlife, etc. Additionally, underground systems and systems that require a large number of sensors are generally permanent and if you own a second home or business, or relocate to a new home or business, a new system installation would be required at the new/secondary location.

In addition to underground solutions, wireless systems are now on the market and are less expensive than professionally installed underground systems. However, they generally limit the containment or tracking zone to a circular shape of approximately three quarters (¾) of an acre or less, as they rely on Wi-Fi signal strength. Additionally, in the specific instance where the system is used for animal containment, it can be difficult to train a pet when the containment zone changes based on environmental conditions and additional signal interference which may affect the signal strength, thus altering the boundary zone. Furthermore, both underground and the wireless solutions fail to take any proactive measures once the individual or object has breached the containment area or leaves the range of detection. Specifically, neither system has a method of tracking location information outside of the boundary of the containment zone.

Somewhat recently, solutions has become available on the market that incorporates a Global Positioning System (GPS) device. Unfortunately, typical GPS systems require professional installation in a roof or attic area of a structure to ensure they get the best possible GPS signal. These systems are therefore are not easily relocated to additional or new locations. Moreover, the systems are highly inaccurate and thus require the owner to have a larger than average property (e.g., 3+ acres) in order to operate the system optimally. However, even with the larger property, the inaccurate location information can make determining a location and boundary difficult.

Because of these limitations, a solution is needed that has the ease of use of the wireless or GPS based systems, with the accuracy and trainability of the underground system. Thus, an embodiment provides a system that does not require the underground wire, does not require professional installation, is truly portable, and can be used for multiple locations with minimal effort (e.g., relocating three or more beacons and a remote tracking device). Some embodiments utilize one or more rechargeable devices (e.g., a rechargeable dog collar), three or more beacon transmitters, and a smart phone application to create and manage a containment zone (e.g., pet containment zone).

In some embodiments, a containment boundary may be created when a user, using a first location sensor (e.g., mobile tracking device, rechargeable collar-mounted device, smart phone, etc.) stores location information. The location information is then recorded as one of a plurality of boundary points. Once a user has recorded each boundary point they wish to have included, they may initiate a boundary creation process (e.g., via smart phone, mobile tracking device, or beacon). The application may then generate a complete boundary area based on the sequential entry of the plurality of data points.

In a further embodiment, a tracking device (e.g., pet collar) integrates location-tracking and containment capabilities. Instead of having to install and maintain an underground system to establish the boundary of the containment zone, the tracking device interacts with ultra-wideband (UWB) beacons (i.e., anchors) to track the location of individuals (e.g., pets) and/or objects within a containment zone. In some embodiments, each anchor will generate a UWB signal which is then detected by the UWB chip installed on the tracking device. In a further embodiment, such as where the system is being used outdoors, the beacons will not actively communicate with each other except during the initial set-up of the containment zone. Additionally or alternatively, in some embodiments, where the system is being used indoors, the beacons may actively communicate with each other.

In some embodiments, three UWB beacons will be utilized. Other embodiments may be optimized with four or more UWB beacons. The beacons may have a range of about 10 to about 150 meters. The beacons may be of various sizes and shapes. It should be understood, that the shape and structure of the beacons may be changed based on the design requirements. For example, some beacons may be designed to be wall mounted, while others may imitate a bollard or pathway light. In a further embodiment, the beacons may be designed to look like vegetation or shrubbery.

In other embodiments, the UWB signal from the beacons will be received by the tracking device, and the location of the tracking device will be tracked as X-Y-Z coordinates relative to the location of the three or more UWB beacons. In the event that a person or pet ignores the containment stimuli, or an alarm goes unnoticed, the UWB chip on the tracking device may enter a low power mode, and the tracking device may automatically switch on an integrated LTE and GPS technology, as discussed herein.

The initial set-up of the system may be governed by a smartphone application that assists in the design of the containment zone. The tracking device may have an integrated Bluetooth chip with which it can receive signals from Bluetooth-enabled smart phones for the initial set-up and configuration and future software updates. As noted above, except for the initial configuration of the containment zone, the UWB beacons may not communicate with each other. Moreover, in some embodiments, the UWB beacons may not communicate with other devices and/or may not be connected to a wireless communications network or to the Internet.

In some embodiments, the UWB chip may operate at a frequency range of about 3.1 GHz to about 10.6 GHz. The transmission power of the tracking device and beacon may be about −41.3 dBm, which complies with the maximum EIRP levels established in the FCC's rules for several UWB applications. In a further embodiment, when the remote tracking device determines a very precise location, it may determine if the location is within a specified distance from the boundary. Based on this determination, the remote tracking device may then take one or more actions (e.g., playing one or more audible tone(s), vibrating, issuing an electrical shock, etc.).

Some embodiments may also comprise a mobile application for managing either the creation of the containment boundary or the monitoring of the pet with respect to the boundary. The mobile application may be executed on a mobile information handling device, such as, a smart phone, tablet, laptop, etc. The mobile application may display on a display device (e.g., built into the mobile information handling device), a graphical user interface (GUI) related to the containment system. As will be discussed further herein, the GUI may contain status information about the containment zone or the tracking device. In addition to status/monitoring information, the GUI may also allow one or more users to interact with the containment system via one or more hardware and/or software devices (e.g., buttons, sliders, switches, etc.). In a further embodiment, the information displayed on the GUI regarding the containment system may be transmitted via Wi-Fi, as discussed herein.

Thus, the embodiments described herein present a technological improvement over the art that amounts to a significant improvement over conventional systems (e.g., underground, wireless, low precision GPS, etc.). As will be discussed further herein, this results from a variety of factors, such as, ease of implementation, mobility, flexibility, and tracking capability.

The present disclosure provides systems, methods, and/or computer program products. The computer program product may include a computer readable storage medium (or media) having computer readable program instructions thereon for causing a processor to carry out aspects of the present disclosure.

The computer readable storage medium can be a non-transitory tangible device that can retain and store instructions for use by an instruction execution device (e.g., one or more processors). The computer readable storage medium may be, for example, but is not limited to, an electronic, magnetic, optical, electromagnetic, semiconductor storage device, or any suitable combination of the foregoing. A non-exhaustive list of more specific examples of the computer readable storage medium includes the following: a portable computer diskette, a head disk, random access memory (RAM), read-only memory (ROM), erasable programmable read-only memory (EPROM or Flash memory), static random access memory (SRAM), a compact disc read-only memory (CD-ROM), a digital versatile disk (DVD), a memory stick, a floppy disk, a mechanically encoded device such as punch-card(s) or raised structures in a groove having instructions recorded thereon, and/or any suitable combination of the foregoing.

A computer readable storage medium, as used herein, is not to be construed as one or more transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium, or to an external computer, or external storage device via a network, for example, the Internet, a local area network (LAN), a wide area network (WAN) and/or a wireless network. The network may comprise conductive transmission cables (e.g., copper cables), optical transmission fibers, wireless transmission, routers, firewalls, switches, gateway computers, and/or edge servers. A network adapter card or network interface in each computing/processing device receives computer readable program instructions from the network and forwards the computer readable program instructions, for storage in a computer readable storage medium, within the respective computing/processing device.

The illustrated example embodiments will be best understood by reference to the figures. The following description is intended only by way of example, and simply illustrates certain example embodiments.

Referring now to FIG. 1, an embodiment of an example system is shown 100. The example system comprises various devices such as: a wireless tracking device 101 (i.e., remote tracking device), such as a collar-mounted device, one or more beacons 102, a mobile application 103, and various global navigation satellite system (GNSS) satellites 104. It should be understood, that any form of navigation satellite may be used in the embodiments discussed herein. For example, embodiments may utilize global positioning system (GPS) satellites, global navigation sputnik system (GLONNASS) satellites, Galileo system satellites, BeiDou system satellites, Indian Regional Navigation Satellite System (IRNSS/NAVIC) satellites, or any other current or future satellite navigation system.

For simplicity, the remainder of the document may simply refer to a GNSS system as GPS or a navigation satellite, however, any of the above terms may be used interchangeably for the purposes of this disclosure. Additionally, throughout this document, GNSS will be referenced with regard to location information. However, it should be understood that location information includes both latitude/longitude location information as well as altitude location information with regard to the disclosed embodiments.

Figure 2:
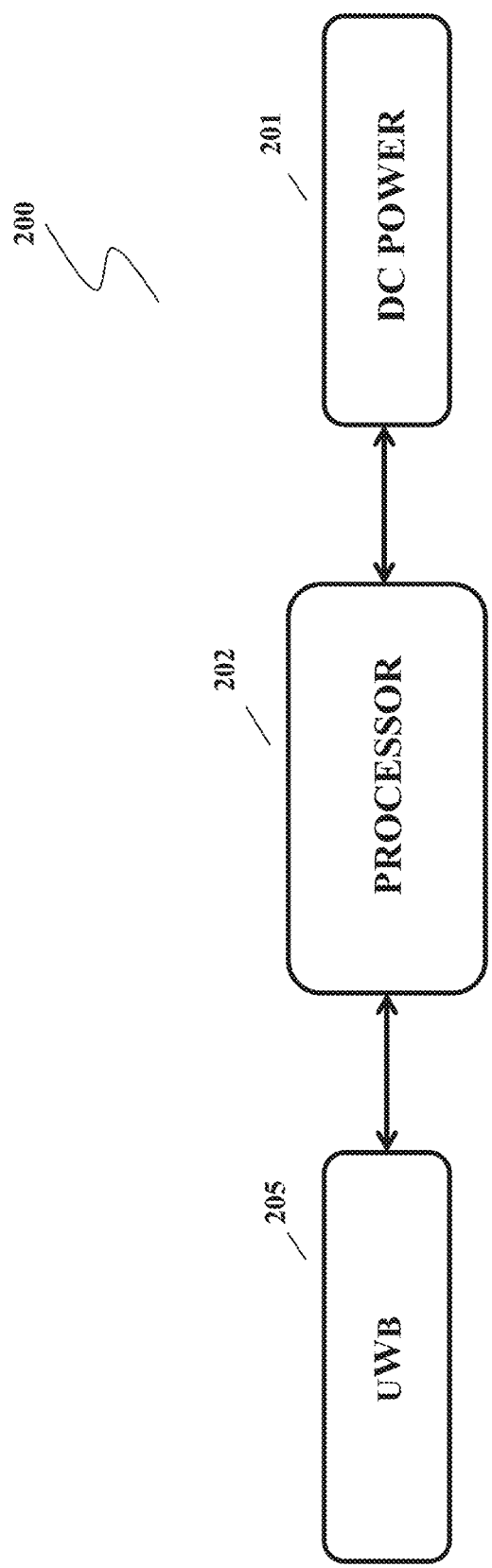
FIG. 2 depicts an illustrative example of a beacon.

In some embodiments, as shown in FIG. 2 a beacon 200 may comprise various components. For example, the beacon 200, may have a power source (e.g., power cord, underground electrical feed, solar power, a battery pack, etc.) 201 to power the beacon. In a further embodiment, the beacon 200 may have a memory and processor (CPU) operatively connected to perform various actions based on software code 202. In a further embodiment, the processor or CPU may be a chip on board (COB) 202. The beacon 200 may also comprise a network connection device that may connect to a network using, for example, a cable connection (e.g., Ethernet) and/or a wireless connection (e.g., Wi-Fi, Bluetooth, etc.). BLUETOOTH® is a registered trademark of Bluetooth Sig, Inc. in the United States of America and other countries.

In some embodiments, the beacon 200 may also comprise a ultra-wideband (UWB) connection 205. Although specific examples of radio frequencies are discussed and illustrated herein, it should be understood that any operable means of wireless communication may be utilized, for example, any frequency bands labeled under the International Telecommunication Union (ITU) format including, but not limited to: Extremely Low Frequency (ELF), Super Low Frequency (SLF), Ultra Low Frequency (ULF), Very Low Frequency (VLF), Low Frequency (LF), Medium Frequency (MF), High Frequency (HF), Very High Frequency (VHF), Ultra High Frequency (UHF), Super High Frequency (SHF), Extremely High Frequency (EHF), Tremendously High Frequency (THF).

Although generally referred to herein as mostly stationary, it should be understood that the beacon may be somewhat mobile. For example, the beacon may derive power from a battery pack, or a car power port. Thus, the beacon, or beacons, in one embodiment may move along with the collar (e.g., to the park, or when trying to locate the dog after containment breach). The accuracy may go down, specifically if less than three beacons are being used.

Figure 3:
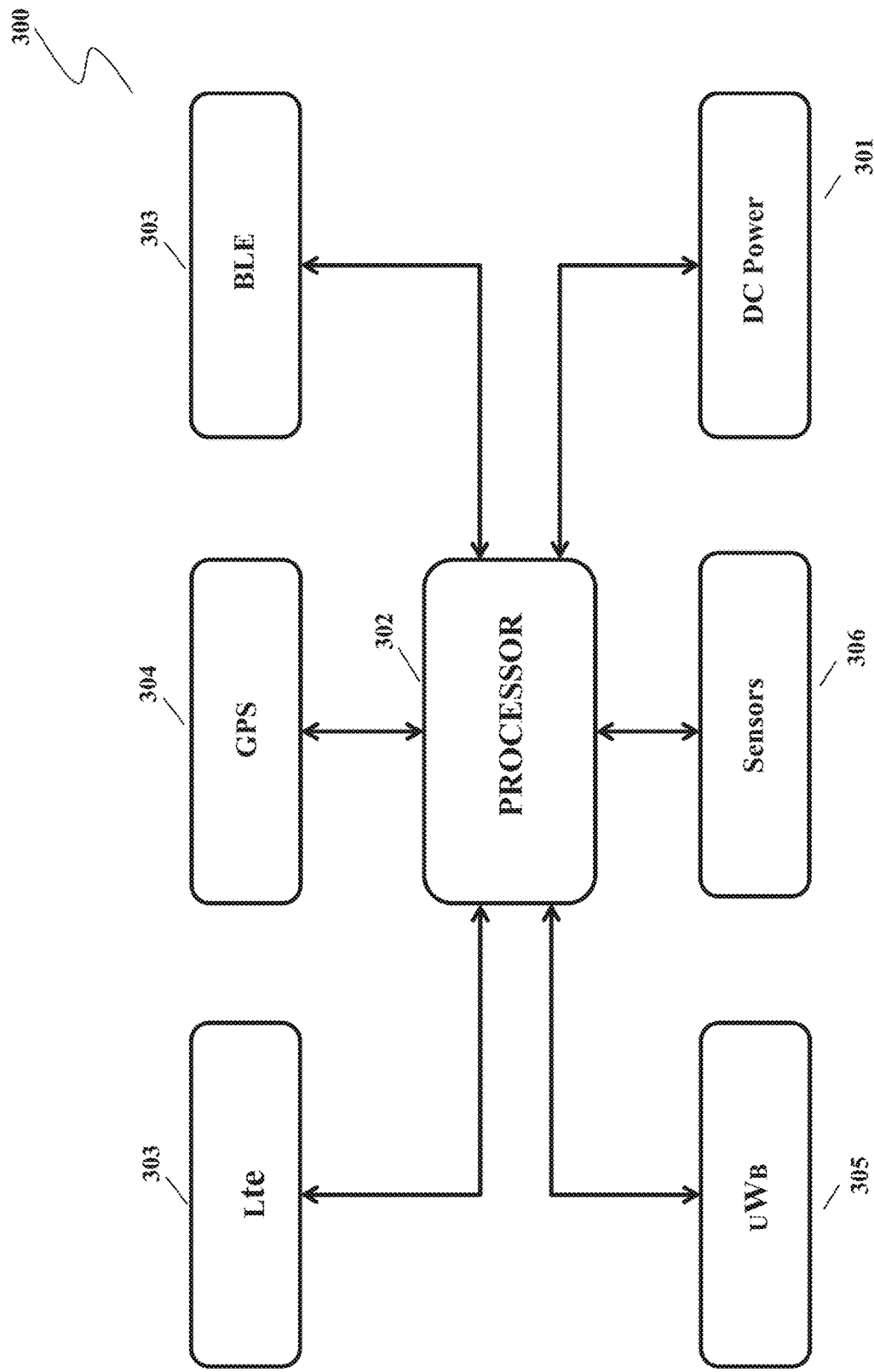
FIG. 3 depicts an illustrative example of a wireless remote tracking device.

As discussed above and illustrated in FIG. 3, some embodiments may also comprise a wireless tracking device 300. For simplicity purposes, the wireless tracking device 300, as discussed herein, may be a collar-mounted electronic tracking device. However, it should be understood, that any tracking device, such as a harness-mounted device, magnetic device, adhesive, wearable device, etc. may be utilized to track an object, individual, animal, or any valuable asset. The wireless tracking device 300 may comprise a power source (e.g., a DC power source such as a battery, solar panel, kinetic generator, etc.) 301 in order to power the onboard electronics. Additionally, in some embodiments, the wireless tracking device 300 may comprise one or more various power conditioners or power converters.

In embodiments in which the power source is a power storage device (e.g., a battery), the wireless tracking device 300 may comprise a power level indicator (e.g. a battery voltage level indicator). Similar to the previously discussed base station, the wireless tracking device 300 may also comprise a global navigation satellite system (GNSS) sensor 304 and a device for ultra-wideband communication device 305.

In some embodiments, the wireless tracking device 300, may have a motion sensor (e.g., accelerometer, gyroscope, or the like) 306 to detect when the wireless tracking device is in motion or undergoing a transition from stationary to motion, or motion to stationary. Some embodiments may also comprise at least one processor 302 to receive and process the input from the various sensors discussed herein. In some embodiments, the wireless tracking device 300 may contain one or more motion, which may be used to estimate tracking data when the signal from an adequate number of beacons is unavailable. Thus, if a pet, for example, entered an area of the containment zone where a usable signal from the required number of beacons (e.g., 1, 2, 3, 4, etc.) is obstructed the inertial tracking system may be used until the signal can be reacquired.

In additional embodiments, the wireless tracking device may have one or more wireless communication devices 303, such as a Long Term Evolution (LTE) antenna and/or a Bluetooth antenna. In alternative embodiments, GNSS sensors and/or an LTE antenna may be part of a secondary device, which may be attached (e.g., clipped, threaded, magnetized, etc.) to the wireless tracking device. In some embodiments, the secondary device may connect and/or communicate with the wireless tracking device via a hardwired connection. In an alternative embodiment, the secondary device may connected to the wireless tracking device using a wireless communication protocol, such as those discussed herein.

In some embodiments, the secondary device may have an internal power source (e.g., a battery, charging system, power connection, etc.). In a further embodiment, the secondary device may obtain its power source from the wireless tracking device. Thus, in some embodiments, the secondary device may be electronically coupled or attached to the wireless tracking device. This connection may be, for example, a hardwired connection, an wireless power connection, an induction power connection, or any method of power transmission known know or in the future.

In addition to tracking and motion detection, some embodiments may comprise additional components that allow for corrective stimulus to be applied or an alarm system to sound. For example, an audio device or audio circuit may play a tone or series of tones to inform of incorrect behavior, or to warn that if the incorrect behavior continues an alternative corrective measure may be employed (e.g., electrical shock), calling the authorities, etc. In some embodiments, a light (e.g., LED) may flash or illuminate indicate incorrect behavior. Additionally or alternatively, a vibration may be provided via a vibration mechanism (not pictured).

Generally, these auditory, visual, and haptic stimuli are used as an early or gentle corrective tool when used as a pet tool. However, if a more direct corrective measure is required, some embodiments may issue an electrical shock (e.g., to the pet via two or more electrodes) or trigger an alarm or messaging system. In some embodiments, the shocking/alarm circuit may have varying levels of intensity, and thus may require a complex circuit to manage. For example, various regulators, as shown, may be implemented to enable the wireless tracking device 300 to issue the corrective action (e.g., electrical shock) at one or more intensity levels.

Figure 4:
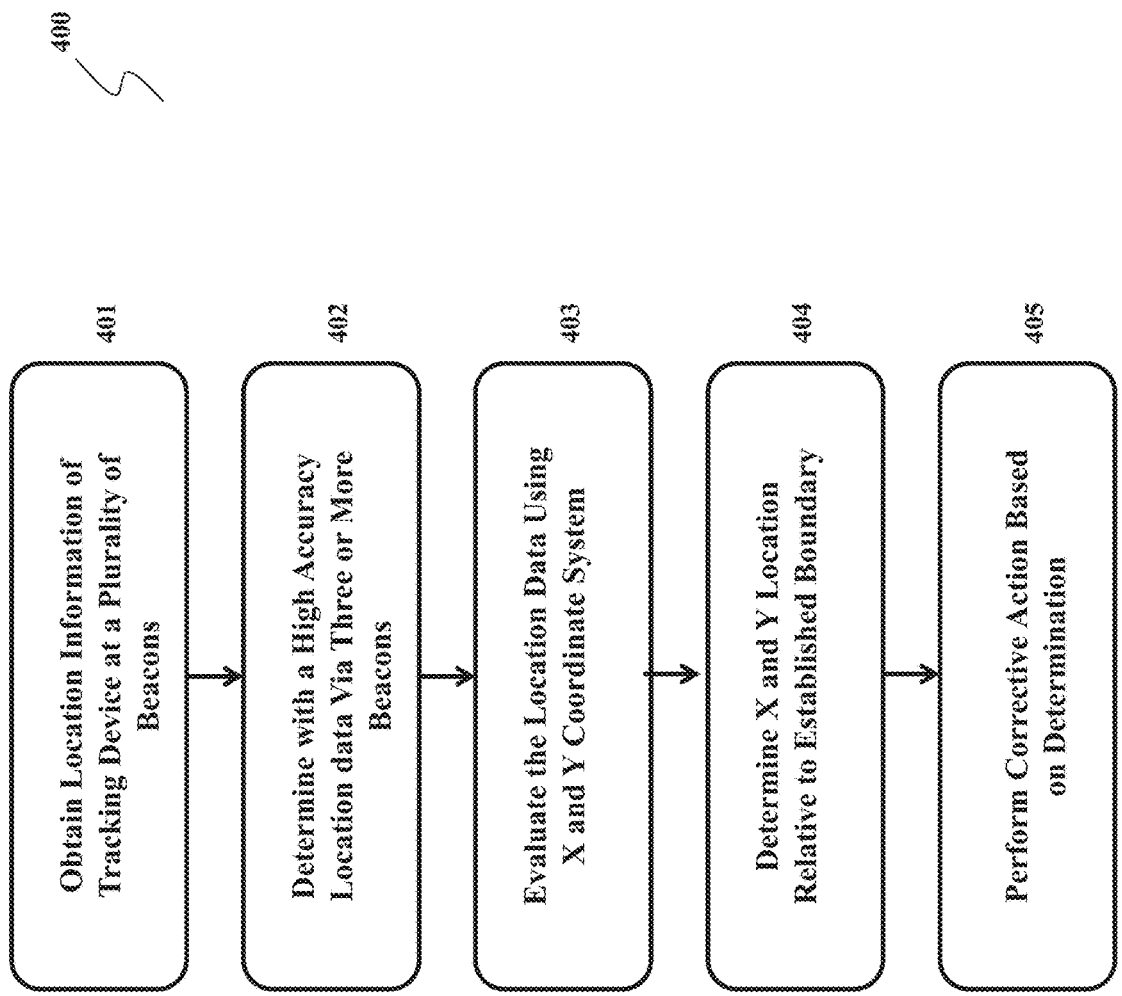
FIG. 4 depicts an illustrative method of monitoring a location detection device and taking correction action if needed.

Referring now to FIG. 4, a representative method is shown for tracking a specific device within a containment boundary. In some embodiments, beacons (e.g., two or more beacons), as discussed herein, may obtain location information related to the remote tracking device 401. As discussed herein, the remote tracking device may also comprise a ultra-wideband communication device. The ultra-wideband communication device may be used to determine the relative location of the remote tracking device 401 (e.g., X, Y, and Z coordinates) based on the known location of the beacons (e.g., two or more beacons) as discussed herein. Once the remote tracking device 300 has determined its approximate location based on the relative location of the beacons 200, the determined location information may be fine-tuned and the accuracy increased.

Accordingly, some embodiments may utilize a sensor within the beacon, as discussed herein, to determine the location of the beacon with a high level of accuracy 402. In some embodiments, the beacon may be a stationary device that a user may place in and/or around their home or business, which utilizes ultra-wideband technology to gather information or location information. Because the one or more beacons 200 generally do not move and their location is known, the remote tracking device's 300 location is determinable based on its location relative to the three or more beacons. In some embodiments, the one or more beacons 200 may regularly send out a pulse or chirp, which can be received at the remote tracking device 300. Because the frequency and/or regularity of the pulses is known, the remote tracking device 300 can determine its relative distance from each beacon 200 within a range. Based on the timing with which each pulse is received, the remote tracking device 300 can determine its location in an X, Y, and Z coordinate system within the containment zone.

In another embodiment, two or more beacons 200 may create line or

Based on the received location information from a plurality (e.g., two or more) beacons, the tracking device may determine an accurate location. Accordingly, in some embodiments, the remote tracking device 300 may evaluate the location data using an X, Y, and Z coordinate system 403. Once a location of the remote tracking device is determined, an embodiment may use this information, as discussed herein, to determine a relative location of the tracking device relative to the created boundary as discussed herein 404.

Figure 5:
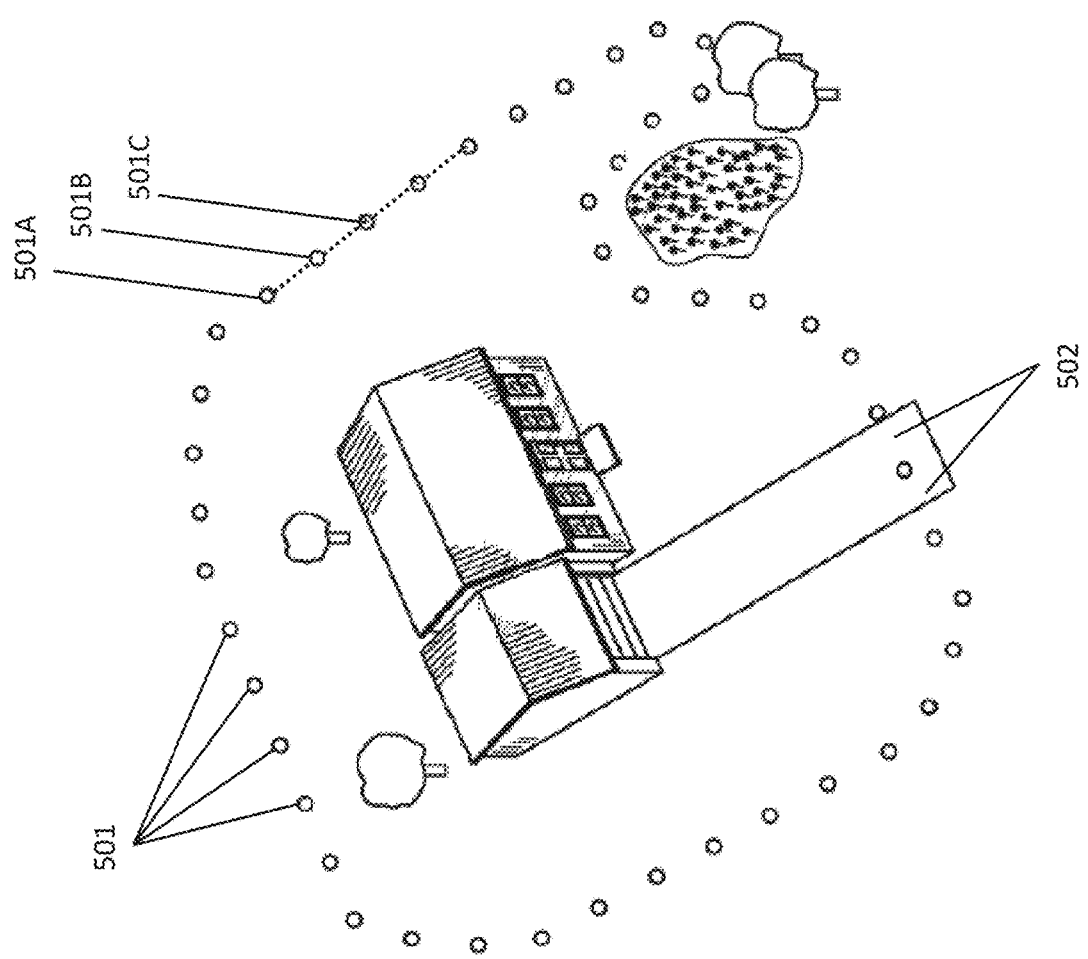
FIG. 5 depicts another illustrative method of generating a boundary for a containment zone.

Thus, in some embodiments, as discussed with regard to obtaining the location information for the tracking device 401, a user may take a device (e.g., the tracking device, smartphone, or other location-sensing tool) to various places to record a highly accurate location. For example, referring to FIG. 5, a user may walk in a path around an area for which they wish to create a boundary zone. As shown in FIG. 5, as a user is walking around the perimeter of their yard, they may stop occasionally to record their location using methods discussed herein 501.

Each of the circles 501 represents a location at which the user recorded their location. In some embodiments, a user may record their location via a user activity such as pressing a button on their smart phone or pressing a button and/or switch on the remote tracking device. In some embodiments, the location may be recorded based on a user's movement. For example, as discussed herein, the mobile tracking device comprises a motion sensor (e.g., accelerometer), and thus can determine if a user is walking or standing still. If the user pauses to stand still for a certain period of time, some embodiments may, determine that the user intended to record their current location for the purposes of creating the containment zone boundary. Alternatively, a user may shake the remote tracking device to indicate their intent to record the location as one of the plurality of points 501.

Referring back to FIG. 4, some embodiments may then take each of the modified points of location information recorded by the user, to create the containment zone boundary and perform a corrective action based on the location of the tracking device relative to the containment boundary 405. This may be carried out by drawing a connecting line between two consecutively received location points or two points that most closely positioned to each other. Thus, the plurality of modified location points are stitched together based on the order in which they were received or proximity to create the pet containment boundary.

In some embodiments, a specific characteristic may be assigned to one or more of the created sections. For example, referring briefly to FIG. 5, a user may wish to be able to pause or disable the corrective action of the remote tracking device, such as, for example to take their dog for a walk, without running the risk of the dog being corrective measure when exiting the boundary. Thus, a user may wish to deactivate the boundary and/or pause the corrective measure of the remote tracking device so they can traverse the edge of their driveway 502, in order to allow their pet to exit the containment zone safely without corrective action.

Thus, some embodiments may further allow for certain portions of the boundary to have various characteristics. These characteristics may include modifiers to the issuance of a corrective action. For example, a user could set a lower intensity shock value for a pet in the back yard and a higher value in the front yard to further reduce the chance of the pet going into the road and/or traffic. Additionally, the characteristics may be modified regarding the type of corrective action, such that one portion of the boundary may issue an audio correction, one may issue a vibration correction, etc.

Some embodiments, similar to the example in FIG. 5, may allow for portions of the boundary to be modified based on various user actions or time-based events. In some embodiments, the change in characteristic may not be tied to the boundary, but instead may be associated with the wireless tracking device. Thus, if a user has multiple pets, a user can simply pause the corrective action for one pet, to allow them to exit the containment zone safely, while maintaining the zone for other pets.

It should also be understood that in some embodiments, multiple containment zones might be created in the same area. Thus, for example, a user may have a front yard containment area and a backyard containment area. The areas may be adjacent (e.g., touching), or separated by property without a containment zone. Moreover, some embodiments may have containment zones within other containment zones. For example, if a user has a pond or flowerbed they wish to keep their pets out of, they may create a containment zone around the perimeter of their property as well as around an area within their property. This would create a boundary within a boundary, thus creating a donut-like effect.

Referring again to FIG. 5, in some embodiments, three or more beacons 501 may be placed around a determined containment zone. In some embodiments, the beacons may be placed up to approximately 50 meters from one another. In an embodiment, the a beacon may create an invisible boundary line between itself and one or more additional beacons. Thus, if two beacons are within range of each other, and in some cases, have a clear line of sight, a boundary vector is created directly between the two beacons. Thus, in some embodiments, such as that shown in FIG. 5, a beacon 501A may create a vector boundary between itself and beacon 501B. Beacon 501B may also create/form a boundary vector with beacon 501C. Thus, as indicated by the dashed lines, an invisible boundary vector may exist between each of the beacons 501.

In some embodiments, the wireless tracking device (e.g., collar) can determine the one or more vector boundaries between two or more beacons. Moreover, because the system can determine the location of the vector bounder, it can also determine the wireless tracking device's approximate location relative the vector boundary. Moreover, in some embodiments, the location of the wireless tracking device may be determined only as the collar approaches the boundary (e.g., vector boundary). Thus, in some embodiments, the collar can be placed in a lower power or non-tracking mode while it is within the boundary, but far enough away from any vector boundary be detected. This allows for power conservation as well as reduced the number of beacons a user may need. For example, on an extremely large property, the tracking feature may be in low power most of or all of the time because the collar never approaches the boundary.

Figure 9:
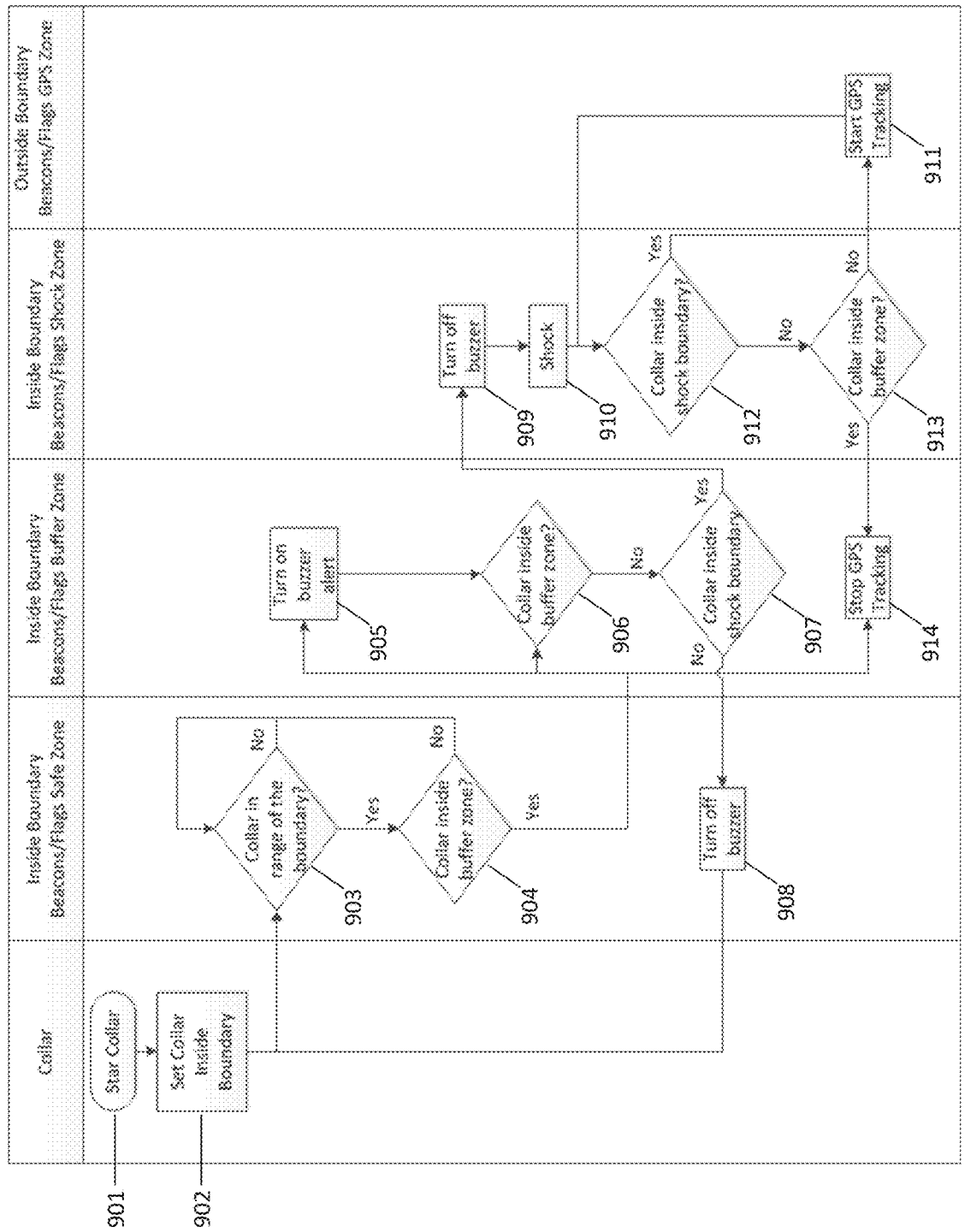
FIG. 9 depicts an illustrative method of implementing smaller boundaries within a larger boundary (e.g., a swimming pool within a yard.)

Referring briefly to FIG. 9, an illustrative example method for processing the functionality of the wireless tracker is depicted according to an embodiment. In this embodiment a tracking device (e.g., a pet's collar) may be initialized 901. Once the tracking device is initialized 901 it can be tracked through various zones (e.g., inside the boundary, a buffer zone near the containment zone (e.g., a zone where an alarm may sound), a containment zone (e.g., where the pet is corrected), and a zone outside the containment area (e.g., where a GPS tracking system may be enabled). In a further embodiment, once the color is initialized 901, the color may be synchronized and/or calibrated in a manner that indicates its location relative to the one or more zones, such as, for example, setting the collar as being inside the boundary 902.

As discussed herein, the wireless tracking device may operate differently and/or have different features/capabilities, depending on the location of the device relative to each of the known zones (e.g., safe zone, buffer zone, shock zone, GPS zone, etc.). In one embodiment, and as shown in FIG. 9, while the color is inside the boundary and in the safe zone, it may determine the collar's relative distance to the range of the boundary 903. If it is determined that the collar is within a detectable range of the collar, the system (e.g., the collar or wireless tracking device) may determine if the collar is inside the buffer zone 904. As discussed herein, the buffer zone may be, in some embodiments, a zone in close proximity to the boundary. Thus, if the wireless collar gets too close to the boundary and/or is at potential risk for crossing the boundary a preliminary correction measure may be implemented (e.g., a buzzer or vibration maybe turned on 905.

In some embodiments, the preliminary correction measure is a measure to allow the animal, pet, or person make voluntary correction prior to issuing a full correction method (e.g., a shock). Thus, in some embodiments, once the buzzer is activated 905, the system may continually check to determine of the collar is still within the buffer zone 906. If the collar is determined to have returned to the safe zone (e.g., is no longer in the buffer zone) 907 the system may turn the preliminary correction (e.g., buzzer) off 908. However, if it is determined that the collar is outside of the boundary all together, the system may then turn the preliminary correction method off 909 and activate the full correction method (e.g., issue a shock) 910 and initiate GPS tracking 911.

In a further embodiment, the system may continually monitor the location of the collar such that if can determine if the collar has reentered the boundary 911. If the system determines that the collar has reentered the boundary 911, it then determines if the collar is within the buffer zone 912. If the collar has returned and is inside the buffer zone, the system may disable the full correction method (e.g., shock) and/or disable the GPS tracking 914. It should be understood, that any combination of multiple boundaries is possible, and that the number of containment zones is virtually limitless (i.e., restricted only by the power of the processing devices and the capacity of the memory, as discussed herein).

Figure 12:
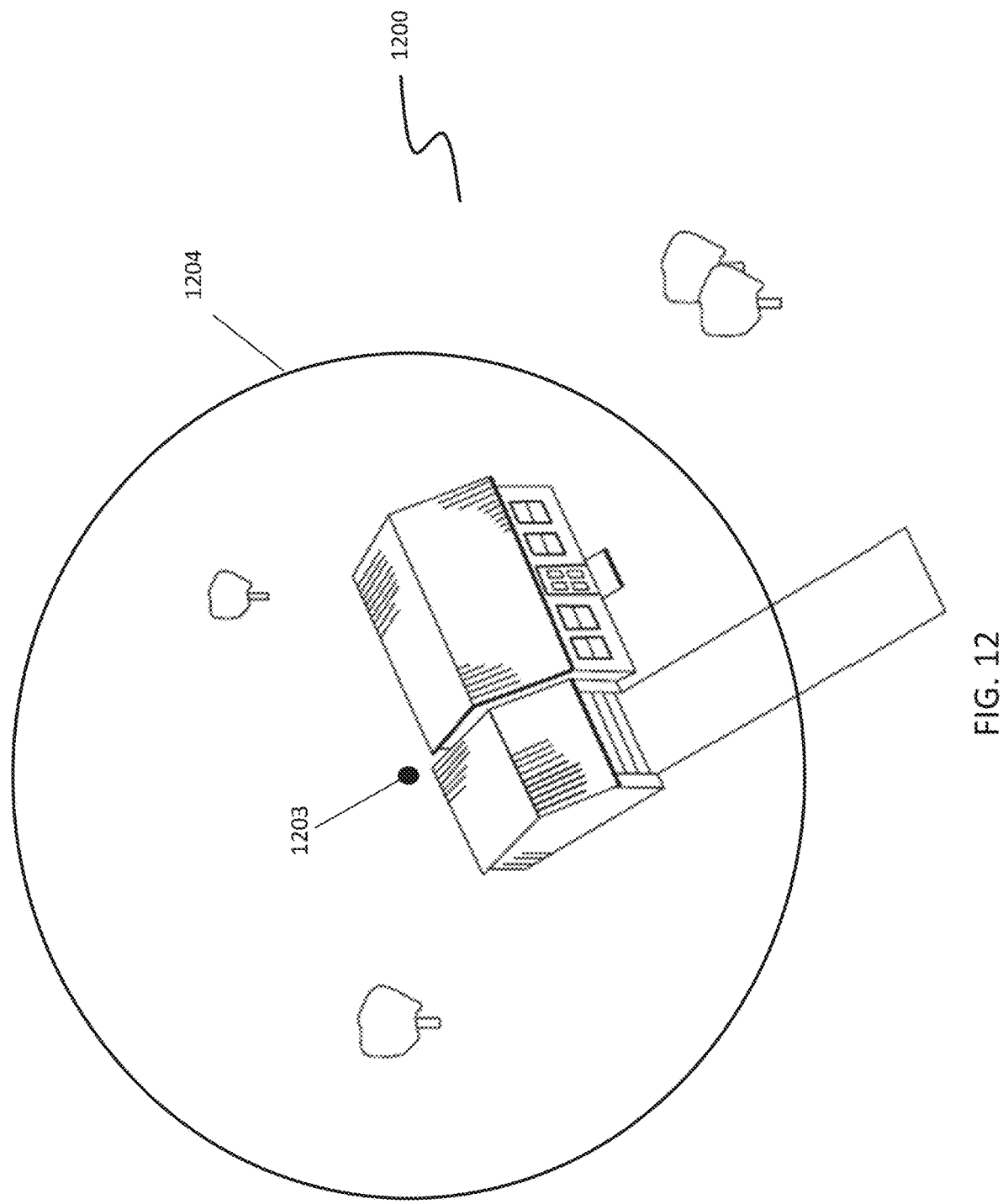
FIG. 12 depicts an illustrative embodiment of a system employing a single beacon using proximity detection.
Figure 13:
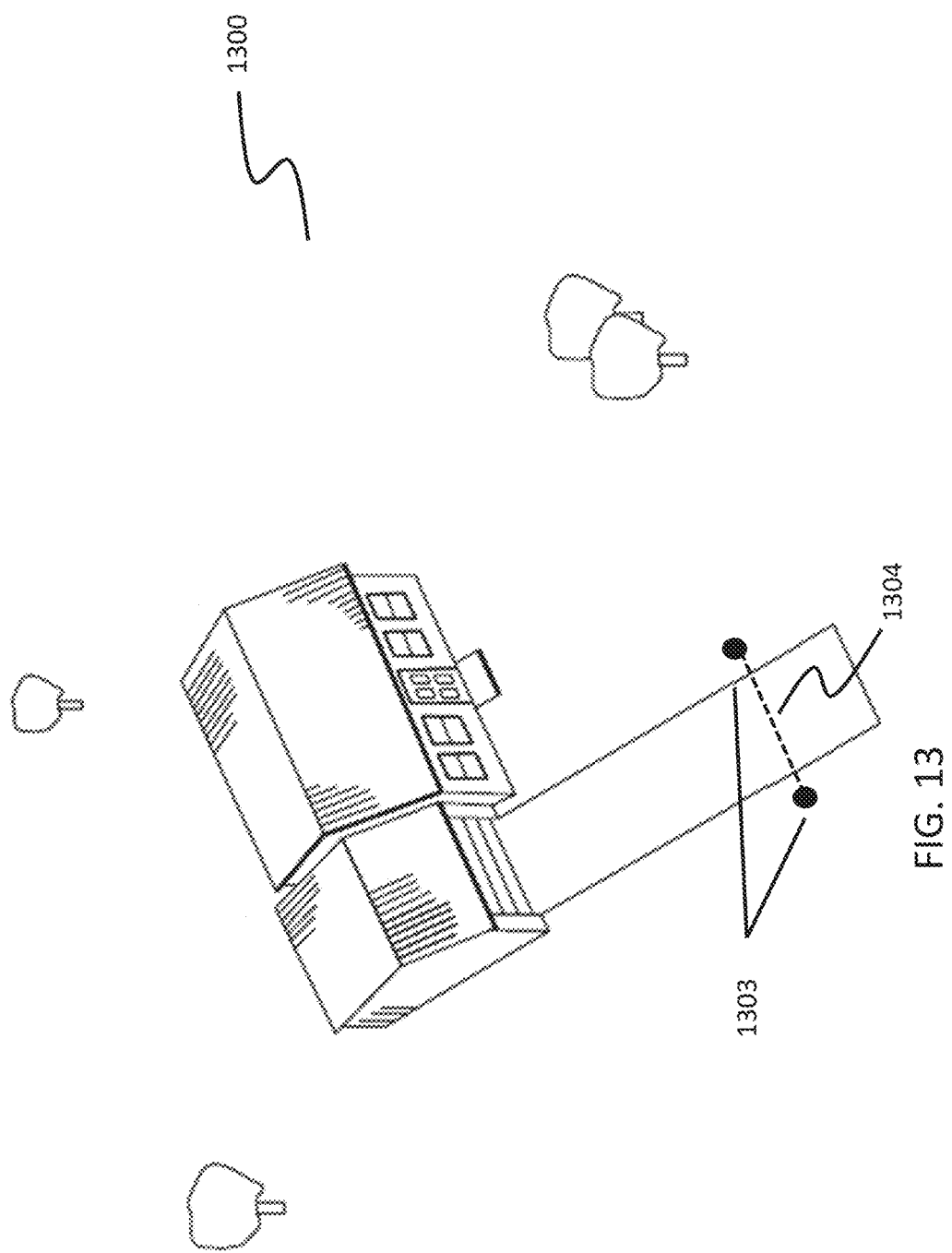
FIG. 13 depicts an illustrative embodiment of a system employing two beacons to create a virtual gate.

In some embodiments, beacons may be able to automatically, or be manually configurable to, create additional types of boundaries. Referring to FIG. 12, a single beacon can function as a more traditional proximity tracking system 1200. Thus, in some embodiments, the singular beacon may create a circular boundary 1204 that can be used as a containment zone, with the beacon 1203 at its center. This allows a user to have a practical solution for when they need to set up a temporary pet containment zone, and/or when they are raveling and unable to setup the full system. Additionally some embodiments may allow beacons to act as wireless fence posts with the boundary configured to connect between adjacent beacons. Referring to FIG. 13, two beacons have been deployed to create a virtual gate which may act as a boundary or simply track the pet as they come and go.

Figure 14:
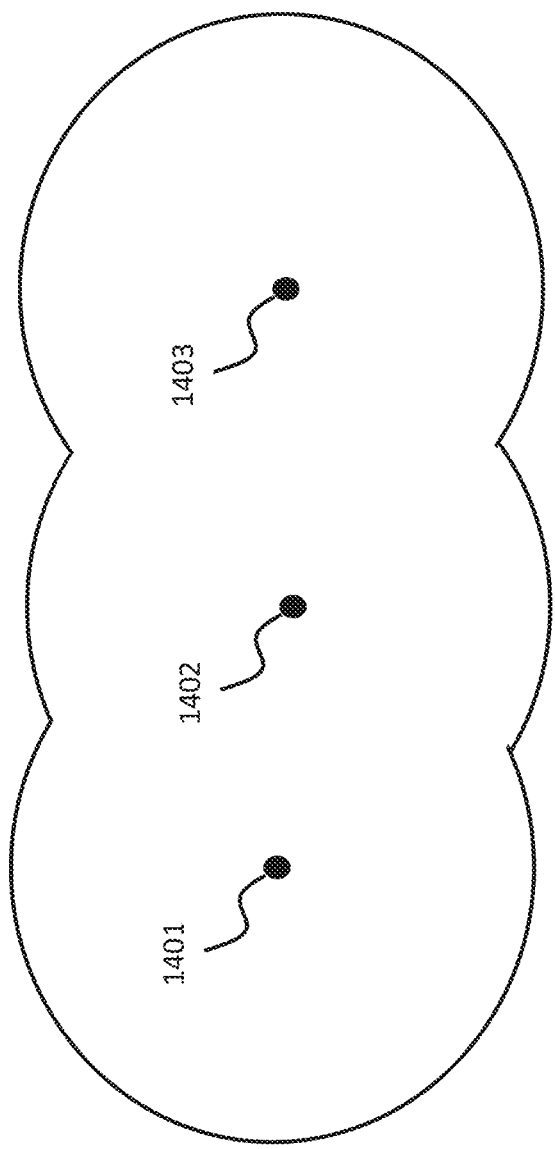
FIG. 14 depicts an illustrative embodiment of a system employing three beacons to create a proximity based containment.

In a further embodiment, two or more beacons may be used to expand the relative size of the proximity boundary. For example, as shown in FIG. 14 a user may place two or more beacons (e.g., 1401, 1402, 1403, etc.) in a line or shape thereby expanding the range and size of the containment area. Thus, because the system is location based, and determined in real time, the wireless tracking device (e.g., collar) is able to easily modify the proximity containment area based on the number of beacons and their relative location(s) to each other.

Not only can multiple boundaries be created for a single geographic location (e.g., a house), but multiple boundaries at, multiple locations, may also be created. For example, if a user has a beach or vacation house, they can create a customized boundary of the property, save the boundary, and associate it with the specific property (e.g., a property profile). Thus, a user may have multiple property profiles associated with various locations. Reducing the need to reestablish the containment boundary every time the system is set up improves the portability and ease of use of the system.

Accordingly, some embodiments may include mounting hardware or a foundational structure such that the beacon can easily be placed in exactly the same location after removal. By way of non-limiting example, if the beacon system involved a bollard like device, a permanent structure may be recessed into the ground to allow for easy removal and reinstallation of the beacon bollard. Additionally or alternatively, the beacon device may be shaped like an orb, cube, disc, cylinder, or the like. Thus, some embodiments may have mounting hardware that allows the beacon to be clipped, magnetized, or otherwise fastened to the mounting hardware. Thus, in various embodiments, the mobility of the beacons may be enhanced using various mounting tools and/or hardware.

Figure 10:
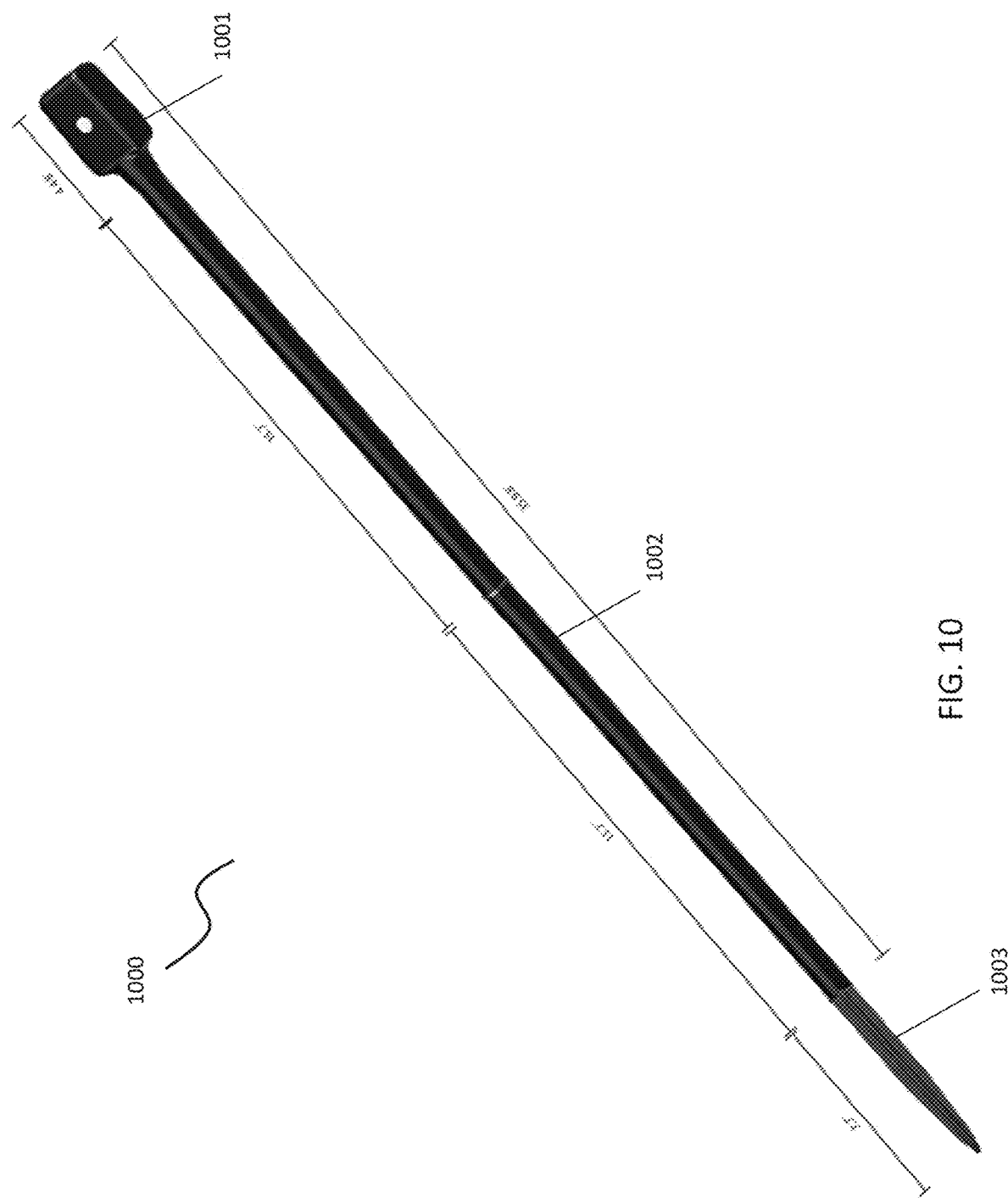
FIG. 10 depicts an illustrative embodiment of a beacon assembly.
Figure 11:
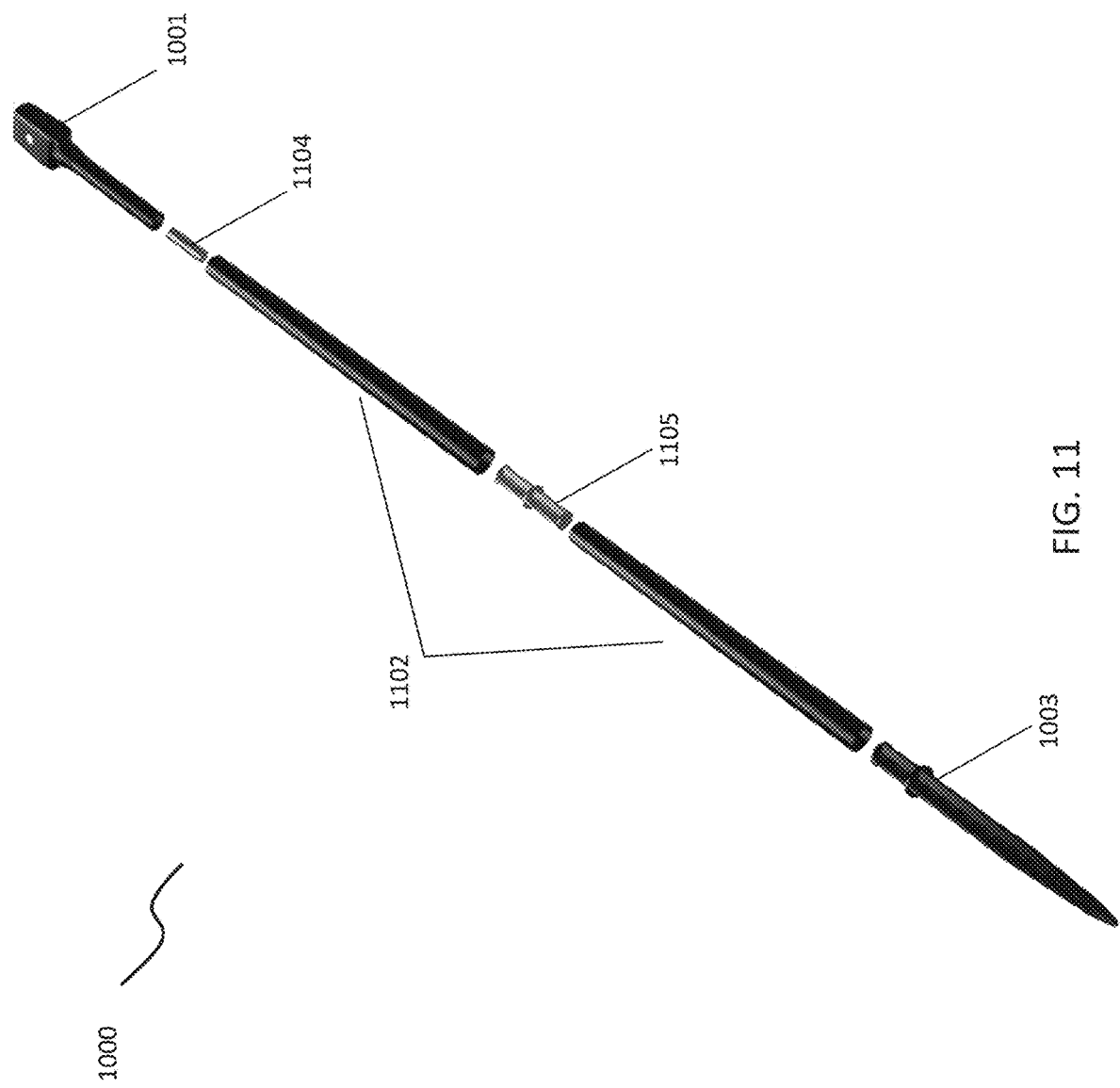
FIG. 11. depicts an exploded view of the embodiment of a beacon assembly in FIG. 10.

FIG. 10 provides an exemplary illustrative embodiment of a beacon assembly 1000. The beacon 1001 is mounted on a post 1002 which improves signal across the user's property by raising the device above ground level obstacles. The assembly 1000 is kept in place a stake 1003 inserted into the ground. Referring to FIG. 11, the same assembly 1000 is depicted in an exploded view. By removing the beacon 1001 from the post 1102, the internal batteries 1104 may be replaced. Multiple posts 1102 may be joined via connectors 1105 to achieve an optimal height to avoid signal obstruction across the containment zone.

Once the containment zone boundary is created using the various techniques discussed herein, some embodiments may monitor one or more pets to determine if they attempt to breach the established boundary. Thus, in some embodiments, location information of the wireless tracking device (i.e., remote tracking device) may be obtained. By way of illustrative example, this location information may relate to the approximate location of a person, pet, or object, such as, a dog, person, object, or asset within in the containment zone. In some embodiments, the wireless tracking device may capture location information in real time (i.e., the actual time during which the tracking device is moving in space).

Figure 6:
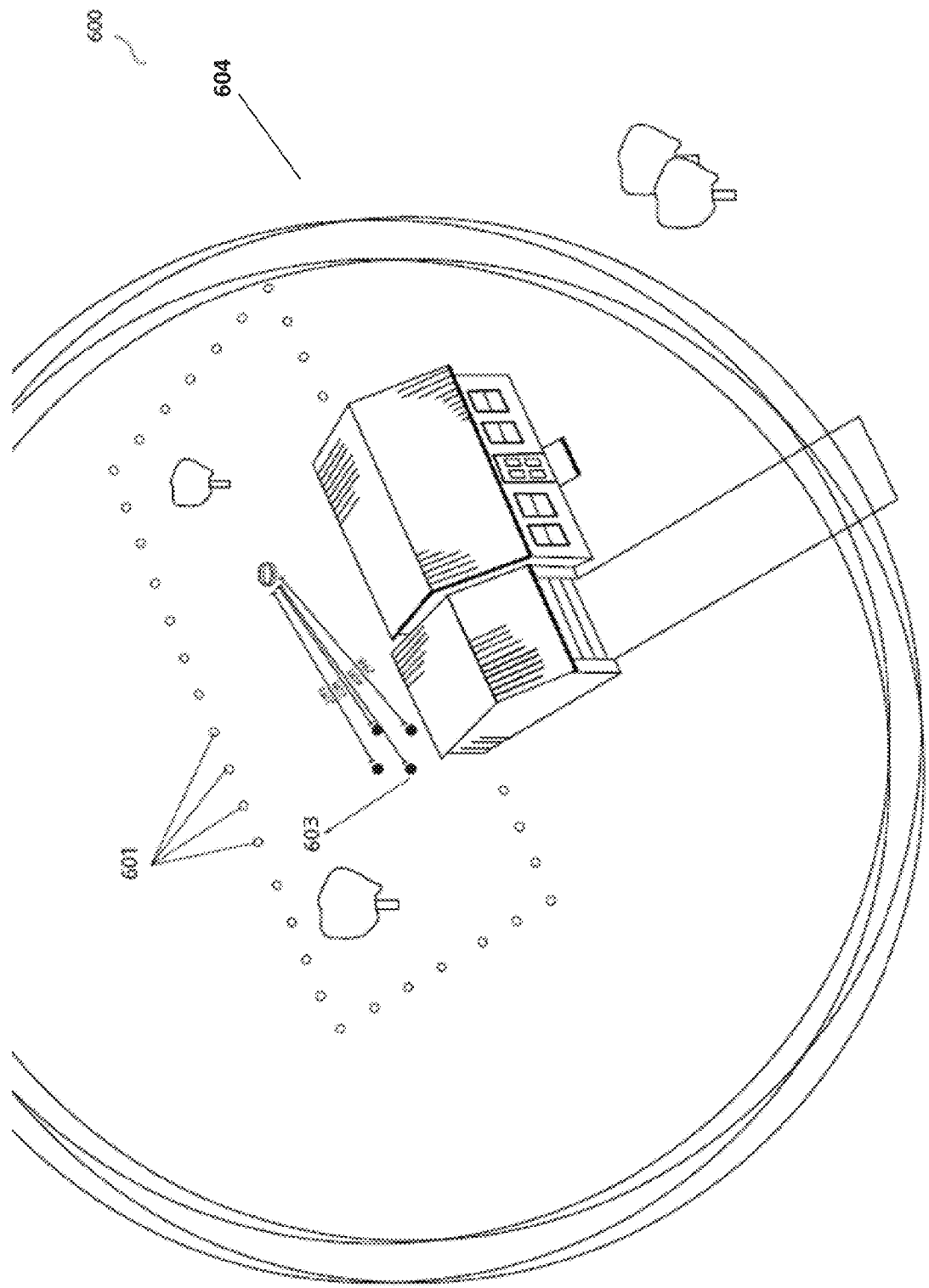
FIG. 6 depicts an illustrative embodiment of a system with overlapping broadcast distance thus allowing triangulation (i.e., trilateration) of a tracking device.

Referring to FIG. 6, the beacons 603 may broadcast (e.g., transmit a pulse/ping) across a known radius 604. As shown, at least three radii 604 overlap the desired boundary zone created by the detected points 601. As discussed herein, the location of the remote tracking device is determined based on three or more beacon locations 603 based on the time delay of receiving the pulse/pings of each beacon. Because the three or more beacons 603 provide a complete coverage of the created boundary zone using the (i.e., the radius zone 604 of each beacon 603 covers the entire boundary area).

Figure 7:
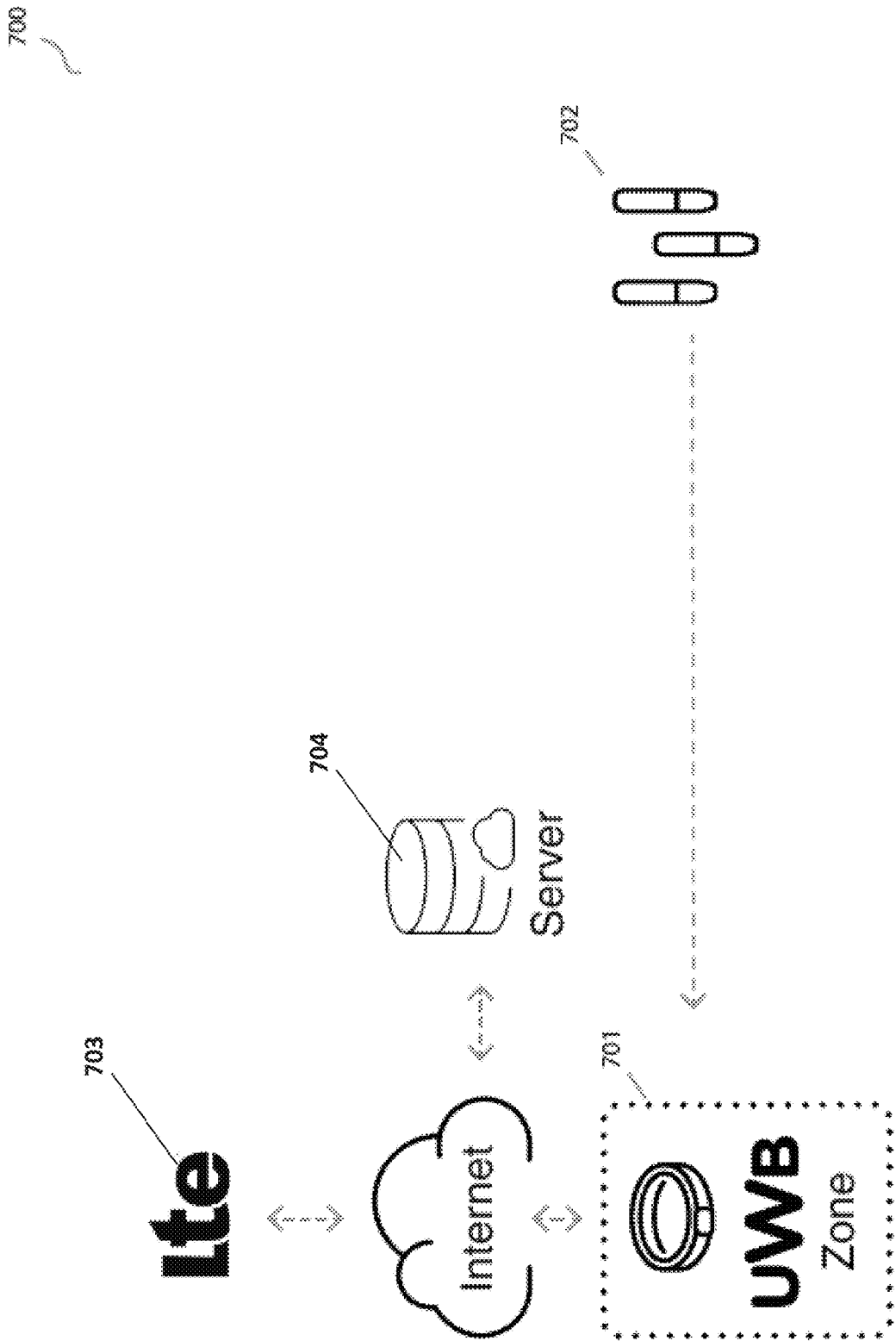
FIG. 7 depicts an illustrative method of determining a precise pet location.

Referring briefly to FIG. 7, an illustrated example of the containment system is shown. As discussed at length herein, the system may comprise a wireless/remote tracking device 701 and one or more beacons 702. In some embodiments, as discussed herein, the remote tracking device 701 may transfer data via a wireless network connection 703 (e.g., LTE, WiFi, etc.). The data may, in some embodiments, be transmitted to a server 704 for storage and/or analysis.

Additionally or alternatively, in some embodiments, a corrective action may comprise sending a communication to one or more user devices. For example, as discussed herein, the remote tracking device may be connected to a computer network using the network connection device (e.g., a LTE connection device), and may thus send a notification, via the computer network, to a user device (e.g., smartphone), notifying them of a pet's current location, for example, if the pet breached the containment zone, was detected within a predetermined distance from the containment zone, etc.

In some embodiments, the pet's real-time location may be transmitted to a user device. For example, if the pet breached the containment zone boundary, a user may receive a notification that the pet is no longer contained, while also being provided location information. The range and accuracy of the pet's location information may be based on the wireless communication method selected for use between the tracking device an d a remote computer system (e.g., server 704). As should be understood by one skilled in the art, different frequencies have different ranges, and thus may influence how far away the pet can be before location information is no longer accessible.

In some further embodiments, when a pet or asset breaks out of the containment area, the remote tracking device may switch tracking methods to allow for a user to track their pet outside of the containment zone. For example, in some embodiments, when a pet or asset is determined to be outside of the containment zone and/or beyond the range of the one or more beacon pings the remote tracking device may turn off the ultra-wide-band communication and enable or rely solely on the use of a GNSS device. Thus, if a pet or asset is beyond the range of the beacons, a user may be able to actively track their pet via a GPS system or the like. As discussed herein, the remote tracking device may then use the built-in LTE connection device to transmit its location to a remote server. Accordingly, a user may have real-time access to their pet or asset's location anywhere a LTE or similar communication system is available.

As discussed herein, the wireless tracking device may have a motion sensor (e.g., an accelerometer) built into its housing. Thus, in some embodiments, the motion sensor may detect the current and historical motion of the pet. Based on this determination, it may be determined that the pet has been motionless or stationary for a period of time (e.g., 1-60 minutes). In order to save battery power, some embodiments may allow certain components to be turned off or enter a low power state. For example, the remote tracking device may turn off all communication other than the ultra-wide band device. In some embodiments, even the ultra-wide band device may be put into a sleep mode. However, once the pet begins to move again, the motion sensor may detect the movement, and all of the components of the remote tracking device may be activated again. In some embodiment, radio modulation may be used for power saving. The wireless tracking device may perform any type of radio modulation to achieve a lower powered signal which still meets system requirements.

It should be understood that although only one wireless tracking device is discussed herein, it is for simplicity only. Multiple wireless tracking devices may be utilized with any of the disclosed embodiments. Stated differently, a user may have multiple pets and multiple tracking devices in one or more containment zones.

Additionally, some embodiments may allow the remote tracking device and/or beacon to communicate with one or more smart devices/objects (e.g., the Internet of Things). Some non-limiting examples of smart devices/objects may include a dog door with a locking mechanism that can be activated or deactivated based on the location of the pet and a feeding system that may be activated based on the location of the pet. It should be understood that any implementation of a smart object relative to the pet's location may be implemented in the various embodiments discussed herein.

As discussed herein, the altitude of a pet may be determined using the GNSS and/or the ultra-wide-band communication modules in the tracking device. Thus, the corrective action, or the smart object interaction, may also be triggered based on the determined height of the pet's location.

In some embodiments, a computer program product for managing a pet containment system may be utilized by a user on one or more user devices (e.g., smartphone, computer, etc.). For example, a user may create a profile or login that may then be shared with family members to access the containment system via one or more mobile applications. Additionally, an embodiment may allow multiple profiles or login credentials to provide different privileges to each user. For example, a parent may have full access to modify the containment system, whereas a child may only have the ability to suppress a corrective action, as discussed at length herein, in order to take the dog for a walk.

As already discussed herein, a user may utilize this application for determining a plurality of boundary points when establishing the containment zone boundary. Additionally, in some embodiments, the application may display a graphical user interface (GUI) related to the pet containment system on a screen of a user device. Using the GUI, a user may receive information, modify the containment system, or perform other actions.

For example, some embodiments may display information indicating that one or more pets have crossed a predefined boundary point (e.g., escaped the containment zone) to a user. Additionally, some embodiments may inform the user if a pet is within a specific range of a predefined boundary point. For example, if a pet has spent a great deal of time at one particular portion of the boundary, there may be something of interest (e.g., another animal) in that area that the user may need to monitor. As discussed herein, the application may also provide information regarding a location of a pet within the containment system and information regarding a location of a pet outside of the containment system. Moreover, some embodiments may go beyond location information. For example, some embodiments may provide the user with a pet activity level. For example, the motion sensor in the remote tracking device may be able to monitor a pet's activity level (e.g., step count) and report the information to the user.

In some embodiments, the application may enable modification of the containment zone and/or the remote tracking device. For example, a user may wish to enable or disable a section of a boundary zone, enable or disable the entirety of a boundary zone, enable or disable the entire containment system, enable or disable the corrective action capabilities of the remote tracking device, and/or assign one or more remote tracking devices to one or more different containment zones. As discussed herein, the application may also be used to enable or disable the corrective actions issued to a particular tracking device (e.g., to allow one or more dogs to exit the containment zone with permission). Additionally, the user may modify which corrective actions are carried out on each of the tracking devices (e.g., audio, vibration, shock, etc.).

Accordingly, as discussed herein, some embodiments provide a system and method for enhanced location tracking for pets within a containment zone. The systems and methods include a mechanism to establish a containment zone boundary, such as, identifying a plurality of location points and connecting the points to form a continuous boundary around a particular zone. Some embodiments provide systems and methods for enforcing the determined containment zone via monitoring a pet's precise location, using various methods described herein, and issuing a corrective action if the pet meets some predetermined criteria (e.g., breaches contain). Additionally, some embodiments provide for a software application, which allows a user to easily manage and monitor the containment zone. The application, as further detailed herein, allows a user to monitor any and all activity in and out of the containment zone as it relates to the pets being remotely tracked. Additionally, in some embodiments, the application allows the user to modify the entire containment system (e.g., turning on and off particular sections).

Computer-readable program instructions for carrying out operations described herein may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including local area network (LAN) or wide area network (WAN), or the connection may be made to an external computer (for example, through the Internet using an Internet Service Provider).

The methods, systems, and computer program products are described herein with reference to flowchart illustrations and/or block diagrams of methods, apparatuses (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, implement the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operations to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
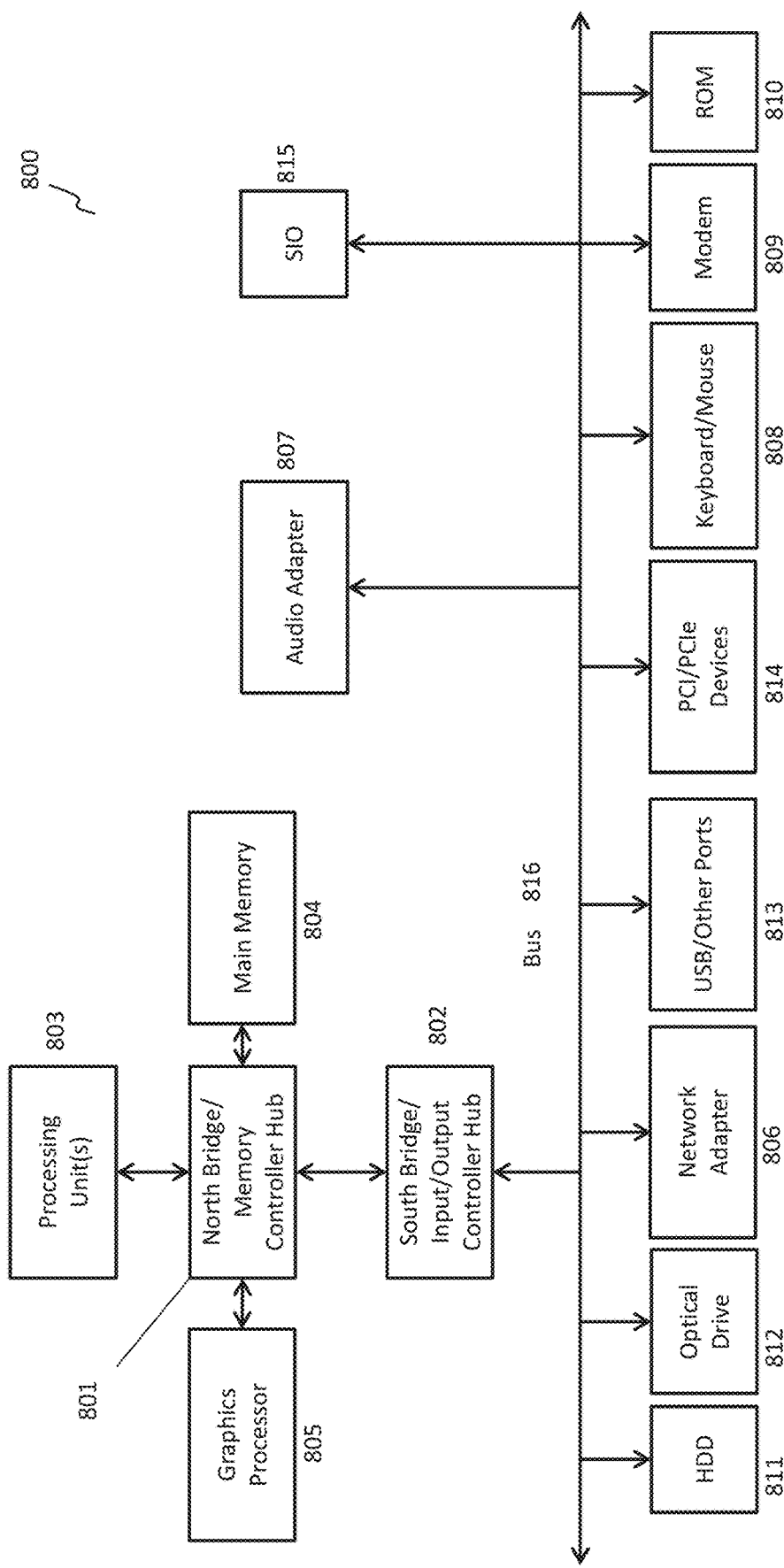
FIG. 8 depicts an illustrative computer system for creating and managing a pet containment zone.

FIG. 8 is a block diagram of an example data processing system 800 in which aspects of the illustrative embodiments are implemented. Data processing system 800 is an example of a computer, such as a server or client, in which computer usable code or instructions implementing the process for illustrative embodiments of the present invention are located. In some embodiments, FIG. 8 may represent a server computing device.

In the depicted example, data processing system 800 can employ a hub architecture including a north bridge and memory controller hub (NB/MCH) 801 and south bridge and input/output (I/O) controller hub (SB/ICH) 802. Processing unit 803, main memory 804, and graphics processor 805 can be connected to the NB/MCH 801. Graphics processor 805 can be connected to the NB/MCH 801 through, for example, an accelerated graphics port (AGP).

In the depicted example, a network adapter 806 connects to the SB/ICH 802. An audio adapter 807, keyboard and mouse adapter 808, modem 809, read only memory (ROM) 810, hard disk drive (HDD) 811, optical drive (e.g., CD or DVD) 812, universal serial bus (USB) ports and other communication ports 813, and PCI/PCIe devices 814 may connect to the SB/ICH 802 through bus system 816. PCI/PCIe devices 814 may include Ethernet adapters, add-in cards, and PC cards for notebook computers. ROM 810 may be, for example, a flash basic input/output system (BIOS). The HDD 811 and optical drive 812 can use an integrated drive electronics (IDE) or serial advanced technology attachment (SATA) interface. A super I/O (SIO) device 815 can be connected to the SB/ICH 802.

An operating system can run on processing unit 803. The operating system can coordinate and provide control of various components within the data processing system 800. As a client, the operating system can be a commercially available operating system. An object-oriented programming system, such as the Java™ programming system, may run in conjunction with the operating system and provide calls to the operating system from the object-oriented programs or applications executing on the data processing system 800. As a server, the data processing system 800 can be an IBM® eServer™ System p® running the Advanced Interactive Executive operating system or the Linux operating system. The data processing system 800 can be a symmetric multiprocessor (SMP) system that can include a plurality of processors in the processing unit 803. Alternatively, a single processor system may be employed.

Instructions for the operating system, the object-oriented programming system, and applications or programs are located on storage devices, such as the HDD 811, and are loaded into the main memory 804 for execution by the processing unit 803. The processes for embodiments described herein can be performed by the processing unit 803 using computer usable program code, which can be located in a memory such as, for example, main memory 804, ROM 810, or in one or more peripheral devices.

A bus system 816 can be comprised of one or more busses. The bus system 816 can be implemented using any type of communication fabric or architecture that can provide for a transfer of data between different components or devices attached to the fabric or architecture. A communication unit such as the modem 809 or the network adapter 806 can include one or more devices that can be used to transmit and receive data.

Those of ordinary skill in the art will appreciate that the hardware depicted in FIG. 8 may vary depending on the implementation. Other internal hardware or peripheral devices, such as flash memory, equivalent non-volatile memory, or optical disk drives may be used in addition to or in place of the hardware depicted. Moreover, the data processing system 800 can take the form of any of a number of different data processing systems, including but not limited to, client computing devices, server computing devices, tablet computers, laptop computers, telephone or other communication devices, personal digital assistants, and the like. Essentially, data processing system 800 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the disclosure has been described with reference to exemplary embodiments, it is not limited thereto. Those skilled in the art will appreciate that numerous changes and modifications may be made to the embodiments described herein and that such changes and modifications may be made without departing from the true spirit of the disclosure. It is therefore intended that the appended claims be construed to cover all such equivalent variations as fall within the true spirit and scope of the disclosure.

What is claimed:

1. A wireless tracking system comprising:
a plurality of beacons, each of the plurality of beacons comprising: at least one antenna and at least one power source, wherein the at least one antenna is configured to transmit a locational ping; and
a wireless tracking device comprising: a processor; at least one antenna; at least one power source; and a non-transitory, processor-readable storage medium that stores instructions executable by the processor to:
receive, using the at least one antenna, a locational ping from at least two of the plurality of beacons;
calculate, based on the locational ping from the at least two beacons, a direct connection path between the at least two beacons;
determine, based on the locational ping from the at least two beacons, a distance of the wireless tracking device relative to the direction connection path; and
perform, based on the proximity distance to the connection path, a corrective measure.

2. The system of claim 1, wherein the wireless tracking device further comprises:
a motion sensor; and
wherein the instructions are further executable by the processor to:
receive, from the motion sensor, inertial movement data; and
determine, based on the inertial movement data, one or more movement factors of the wireless tracking device.

3. The system of claim 2, wherein the instructions are further executable by the processor to:
determine, based on the inertial movement data, that the wireless tracking device is within range of at least one beacon;
determine, by the processor, that the wireless tracking device failed to receive a locational ping from the at least one beacon, and
alert, by the processor, a user that the at least one beacon is in an error state.

4. The system of claim 2, wherein the instructions are further executable by the processor to:
determine, based on the inertial movement data, that the wireless tracking device has been stationary for a period of time; and
deactivate certain components within the system to save power.

5. The system of claim 1, wherein one or more of the plurality of beacons are designed to replicate at least one of a man-made and a natural object.

6. The system of claim 1, wherein the locational ping is transmitted using ultra-wide band.

7. The system of claim 1, wherein the system is initialized using a mobile computing device comprising: a processor; at least one antenna; and a non-transitory, processor-readable storage medium that stores instructions executable by the processor to:
receive, using the at least one antenna, beacon data for each of the plurality of beacons;
associate, based on the beacon data, each of the plurality of beacons with an identifier; and
configure a mode of operation for the wireless tracking device.

8. The system of claim 1, wherein the wireless tracking device further comprises at least one of a GNSS system, a GPS system, and cellular network interface.

9. The system of claim 1, wherein the instructions are further executable by the processor to:
transmit, using the at least one antenna, a signal to at least one of the plurality of beacons requesting the beacon to modulate into a power save mode.

10. A method of wireless tracking comprising:
receiving, using at least one antenna, a locational ping from at least two of a plurality of beacons at a wireless tracking device;
calculating, using a processor, a direct connection path between the at least two beacons based on the locational ping from each of the at least two beacons;

determining, based on the locational ping from the at least two beacons, a distance between the wireless tracking device and the direct connection path; and performing, based on the distance, a corrective measure.

11. The method of wireless tracking of claim 10 further comprising:

receiving, from a motion sensor, inertial movement data; and determining, based on the inertial movement data, one or more movement factors of the wireless tracking device.

12. The method of wireless tracking of claim 11 further comprising:

determining, based on the inertial movement data, that the wireless tracking device is within range of at least one beacon;

determining, by the processor, that the wireless tracking device failed to receive a locational ping from the at least one beacon, and alerting, by the processor, a user that the at least one beacon is in an error state.

13. The method of wireless tracking of claim 11 further comprising:

determining, based on the inertial movement data, that the wireless tracking device has been stationary for a period of time; and deactivating certain components within the system to save power.

14. The method of wireless tracking of claim 10, wherein one or more of the plurality of beacons are designed to replicate at least one of a man-made and a natural object.

15. The method of wireless tracking of claim 10, wherein the locational ping is transmitted using ultra-wide band.

16. The method of wireless tracking of claim 10, wherein the system is initialized using a mobile computing device comprising:

receiving, using the at least one antenna, beacon data for each of the plurality of beacons;

associating, based on the beacon data, each of the plurality of beacons with an identifier; and configuring a mode of operation for the wireless tracking device.

17. The method of wireless tracking of claim 10, wherein the wireless tracking device further comprises at least one of a GNSS system, a GPS system, and cellular network interface.

18. The method of wireless tracking of claim 10, further comprising:

transmitting, using the at least one antenna, a signal to at least one of the plurality of beacons requesting the beacon to modulate into a power save mode.

* * * * *